United States Patent [19]

Smith

[11] 4,438,296

[45] Mar. 20, 1984

[54] MULTIMESSAGE AUTOMATIC TELEPHONE POLLING METHODS AND APPARATUS

[75] Inventor: Fred J. Smith, Plantation, Fla.

[73] Assignee: Digital Products Corporation, Fort Lauderdale, Fla.

[21] Appl. No.: 182,943

[22] Filed: Sep. 2, 1980

[51] Int. Cl.³ .............................................. H04M 3/46
[52] U.S. Cl. .................................. 179/6.02; 179/6.08; 179/6.17; 179/90 B
[58] Field of Search ...................... 179/6.02, 6.05, 6.08, 179/6.17, 6.06, 90 B, 90 BD; 369/28, 27, 30, 53; 360/72.2, 12, 31.137

[56] References Cited

U.S. PATENT DOCUMENTS 3,640,479  2/1972  Hata ....................................... 360/132
4,160,125  7/1979  Bower ................................. 179/6.02
4,210,785  7/1980  Huber ................................... 369/30

*Primary Examiner*—Alan Faber
*Attorney, Agent, or Firm*—Lerner, David, Littenberg, Krumholz & Mentlik

[57] ABSTRACT

Multimessage automatic telephone polling methods and apparatus are provided wherein, telephone numbers for automatic dialing are selected from a queue upon a basis of least prior unsuccessful attempts at calling each telephone number. Thereafter, selection occurs upon the basis of association with the message in place at the playback station to insure that media displacement is maintained at a minimum. Thus, a selected number of attempts at calling each telephone number in the list is performed in a sequence calculated to achieve maximum operation efficiency and minimum media wear.

33 Claims, 3 Drawing Figures

MULTIMESSAGE AUTOMATIC TELEPHONE POLLING METHODS AND APPARATUS

BACKGROUND OF THE INVENTION

This invention relates to improvements in automatic telephone polling equipment of the type where a list of telephone numbers are automatically dialed and a prerecorded message is delivered to each location which responds and, more particularly, to improved telephone polling techniques enabling the selective announcement of one of a plurality of prerecorded messages to each responding location.

Automatic telephone polling equipment has, in recent years, gained wide popularity as a means for reaching a large number of people on an individual, personalized basis, to enable the delivery of a selected message. The message may take the form of a commercial advertisement, a sales solicitation, information bulletins provided to subscribers, or even specialized sale information provided to a select list of customers.

A relatively advanced form of telephone polling equipment is disclosed in U.S. Pat. Nos. 4,160,125; 4,188,510; and 4,201,896. Each patent issued in the name of David S. Bower and Fred J. Smith and is assigned to the same assignee as the instant application. In the telephone polling apparatus set forth in each of these patents, logical techniques are employed to cause polling on the basis of fixed increments from an initial seed telephone number such that, for example, an initial telephone call is placed to a selected initial phone number and thereafter succeeding cells are placed to telephone numbers selected on the basis of fixed increments added to the original seed number. The automatic telephone polling equipment set forth additionally employs logical techniques to ascertain whether or not an appropriate response has been obtained from the location whose telephone number has been automatically dialed and whenever an appropriate response is ascertained, a selected message is automatically issued to that location. This equipment also includes means for recording selected responses from the site contacted so that, in the case of sales solicitations and the like, orders may be directly placed from the site contacted. The automatic telephone polling apparatus disclosed may only act to deliver a single message within a polling sequence, although the individual message to be delivered within a given polling operation may be readily changed and the telephone numbers selected for a given polling operation are based upon fixed increments employed for the purposes of generating successive telephone numbers from the initial seed number selected. The condition of the telephone line being monitored, i.e., busy signal, response by an individual, response by a recording device, dial tone, ringing and the like are also handled through logical techniques.

Improved techniques for ascertaining the condition on the telephone line under conditions which might typically be encountered by such automatic telephone dialing equipment are set forth in U.S. application Ser. No. 101,149, now U.S. Pat. No. 4,356,348, as entitled "TECHNIQUES FOR DETECTING A CONDITION OF RESPONSE ON THE TELEPHONE LINE" which was filed Dec. 7, 1979, in the name of Fred J. Smith and is assigned to the assignee of the instant application. In this application, microprocessor techniques are employed to ascertain time intervals between the zero crosspoints of an input signal from the telephone line and the most prevalent interval present is determined. Once such interval is determined, it is compared with succeeding time intervals of the input signal and the results of the comparison are employed in classifying the input signal as periodic or not.

The nature of the periodic or non-periodic signals thus ascertained may then be further analyzed to determine the precise condition on the telephone line and an absence of signal for a selected period following a detection of periodic or non-periodic input signals may then be relied upon to indicate that an announce operation may be initiated. The techniques set forth in this application for detecting a condition of response on a telephone line quickly enables automatic polling equipment using these techniques to ascertain when a dial tone has been acquired, or when ringing is occurring and when the same has occurred for too long a period, when the dialing operation has resulted in a busy signal, or if the site has been contacted and the nature of the response elicited therefrom, i.e., an individual or an automatic answering device.

While advanced telephone polling equipment of the foregoing kind has proven highly popular, its use per se has spawned a need for even more advanced forms of equipment exhibiting greater flexibility, together with the capability of operating in conjunction with fixed lists of telephone numbers to be dialed. Additionally, a multimessage capability wherein selected messages are issued as a function of the telephone number being automatically dialed would be highly advantageous. Thus, for instance, for applications wherein retain selling establishments employ such equipment to advise selected customers of periodic purchasing opportunities, the use and retention of fixed lists of telephone numbers would be highly convenient. Such lists could be established to represent selected classes of customers appreciating and responsive to periodic advisory messages and the ability to deliver selected ones of a plurality of prerecorded messages would further enable classification of such customer lists into interest categories. Furthermore, a subscriber service providing selected advisory information to one or more defined classes of subscribers would also require a selective, multimessage capability to further categorize selected classes of subscribers into interest groups so that messages containing only desired information were provided to the thus defined subscribers. Similarly, in the advertisement, sales solicitation, or other polling situations, it will be appreciated that once lists of telephone numbers representing receptive candidates were established, a multimessage capability could be employed to further categorize such lists into appropriate interest areas.

While the introduction of microprocessor techniques such as is described in U.S. patent application Ser. No. 101,149, as aforesaid, readily facilitates the use and retention of telephone number listings in automatic telephone polling equipment employing microprocessors, and the attendant memories thereof, it will be readily appreciated that providing a multimessage capability for such equipment as well as establishing modes of operation which insure that each telephone number in a list is not only called but contacted presents significant additional problems. This position is taken because, as will be readily appreciated by those of ordinary skill in the art, continuously repositioning a magnetic media to establish a select prerecorded message at a playback station in response to the message requirements of a next telephone number in a list will result in significant media wear when the nature of an automatic polling system is considered and, in addition, the time involved in continuously repositioning the playback media will cause very significant delays in the overall operation of such automatic polling equipment to the extent that much of the operational time thereof will be consumed by repositioning the playback media. Furthermore, significant media repositioning time will also be consumed under circumstances where the automatic dialing of a given telephone number in a list results in a busy tone or answering by an automatic device, for which conditions no announcement is desirable, but, instead, a recalling of that location at some subsequent time is required. Thus, under these conditions, too, wasteful repositioning time for the magnetic media is consumed and additional wear will occur without an announcement taking place. The requeuing of telephone numbers in the list under conditions where an initial call resulted in the telephone not being answered, a busy signal, or answering by an automatic answering device or the like need also be provided for in a manner such that the operating time of the system is utilized at optimum efficiency while a reasonable number of attempts to call each number in the list results to insure the efficacy of the unattended operation of the system.

Therefore, it is an object of the present invention to provide automatic telephone polling methods and apparatus having a multimessage capability.

It is another object of the present invention to provide automatic telephone polling methods and apparatus enabling a list of telephone numbers to be established and automatically dialed under circumstances where each telephone number in the list defines one of a number of messages to be issued in association therewith and upon the receipt of an appropriate response to dialing of a telephone number in said list, the selected message associated therewith is automatically announced.

It is an additional object of the present invention to provide multimessage automatic telephone polling methods and apparatus wherein prerecorded messages are announced in an order to minimize message queuing.

It is a further object of the present invention to provide multimessage automatic telephone polling methods and apparatus wherein prerecorded messages are announced in an order to minimize media wear.

It is another object of the present invention to provide multimessage automatic telephone polling methods and apparatus wherein each successive telephone number automatically dialed is selected on the basis of the prerecorded message currently at the playback station.

It is an additional object of the present invention to provide automatic telephone polling methods and apparatus wherein telephone numbers to be dialed are selected upon a basis corresponding to the number of previous attempts at contacting telephone numbers to be dialed.

Other objects of the present invention will become apparent from the detailed description of an exemplary embodiment thereof which follows and the novel features of the present invention will be particularly pointed out in conjunction with the claims appended hereto.

SUMMARY OF THE INVENTION

The present invention proceeds upon a recognition of the principle that unnecessary displacement, the time required therefor and attendant wear of a prerecorded media are avoided in automtic telephone polling equipment by normally operating in a mode wherein the next telephone number selected for automatic dialing is associated with a message already in place at the playback station. Additionally, to insure efficient operation of the system and that previously dialed telephone numbers which were not successfully contacted are again subjected to active status within the queue, telephone numbers selected from the queue of numbers to be dialed are also selected on the basis of the number of previous attempts at contacting each telephone number.

Multimessage automatic telephone polling methods and apparatus are provided in accordance with the teachings of the present invention wherein telephone numbers for automatic dialing are selected from a queue upon a basis of least prior unsuccessful attempts at calling each telephone number set forth and thereafter, upon the basis of association with the message in place at the playback station to insure that media displacement is maintained at a minimum while at least a selected number of attempts at calling each telephone number in the list is performed in a sequence calculated to achieve maximum operational efficiency and minimum media wear.

BRIEF DESCRIPTION OF THE DRAWINGS

The invention will be more clearly understood by reference to the following detailed description of an exemplary embodiment thereof in connection with the accompanying drawings, in which.

DESCRIPTION OF THE PREFERRED EMBODIMENT

Figure 1:
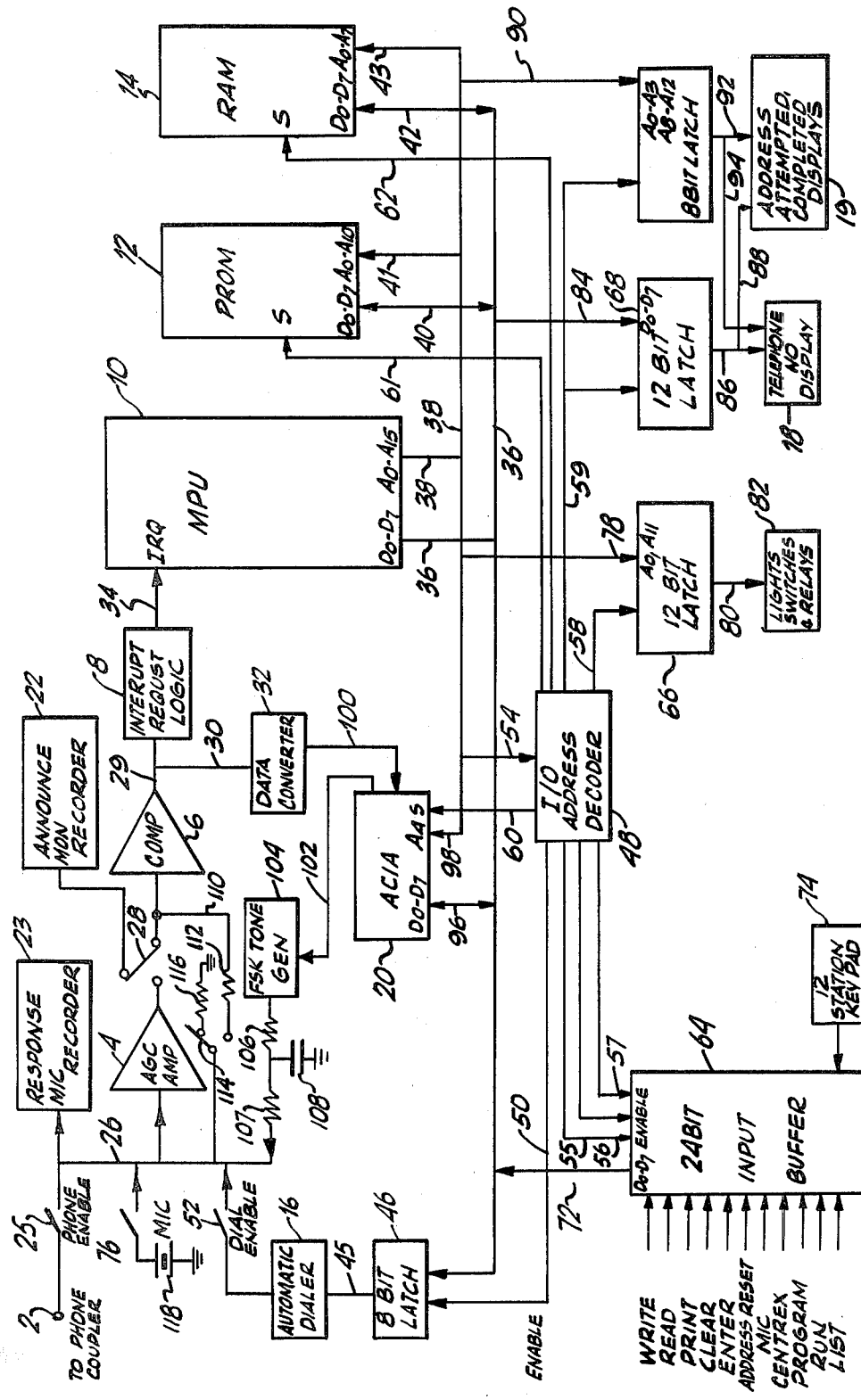
FIG. 1 is a block diagram of an exemplary embodiment of automatic telephone polling apparatus, operable in a multimessage mode, in accordance with the teachings of the present invention.

Referring now to FIG. 1, there is shown a block diagram of an exemplary embodiment of automatic telephone polling apparatus, operable in a multimessage mode, in accordance with the teachings of the present invention. The exemplary embodiment of the automatic telephone polling apparatus illustrated in FIG. 1 comprises an input/output terminal 2, an automatic gain control amplifier means 4, comparitor means 6, interrupt request logic 8, a microprocessor 10, a PROM 12, a RAM 14, automatic dialer means 16, displays 18 and 19, and an asynchronous communications interface adapter 20 and response and announce recorders 22 and 23.

The structure illustrated in FIG. 1 corresponds essentially to the CGS—4K programmable dialer which is commercially available from Digital Products Corporation, the assignee of the instant application. However, as will be readily appreciated by those of ordinary skill in the art, a portion of the memory provided to the PROM 12 has been modified to cause the apparatus illustrated in FIG. 1 to operate in a multimessage mode in accordance with the teachings of the instant invention, even though other modes of operation such as the manner in which automatic dialing of phone numbers is initiated, the manner in which the condition on the telephone line is monitored to ascertain whether an appropriate response is received, and indications that an announced condition is present are the same. Similarly, the attendant causation of an announcement to be initiated, the manner in which a response on the phone line is ascertained and recorded are also retained in original form as is the program present in the ROM 12 therefor. Thus, while the block diagram illustrated in FIG. 1 has been set forth within the instant application for purposes of completeness, it will be appreciated that additional detail pertaining to the structure or programs not highly germain to the concepts of the instant application may be obtained from Digital Products Corporation and are otherwise in the public domain.

Turning specifically to FIG. 1, it will be appreciated that the input/output terminal 2 is connected through a conventional telephone coupler, not shown, to a telephone line through a standard off-hook control as is usual for connecting automatic dialing equipment of the type herein illustrated. The input/output terminal 2 is connected through a phone enable switch 25 to a main input conductor 26 through which information from the phone line is obtained and through which information is introduced to the phone line via the phone enable switch 25 and the telephone coupler connected to the input/output terminal 2.

Information received from the phone line via the closed phone enable switch and the main input conductor 26 is connected to an automatic gain control amplifier 4 or, alternatively, to the response recorder 23. The automatic gain control amplifier 4 may take any of the conventional forms of this well-known class of device and acts in the conventional manner to maintain the output thereof at a relatively constant level for a predetermined range of input values by varying the gain applied to the inputs thereto in a predetermined manner. The automatic gain control amplifier 4 is operative to receive signals from the phone line whenever the exemplary embodiment of the automatic telephone polling apparatus illustrated in FIG. 1 is listening to the phone line to ascertain the presence of certain specified conditions thereon.

These conditions, as shall be described in greater detail below, involve determinations by the microprocessor means 10 to ascertain whether or not dial tone has been acquired so that a dialing operation may be initiated, when ringing is taking place so that a waiting period to ascertain whether or not a response condition is present may initiated, or the detection of a busy condition, an answering device response condition, or a valid answer by an individual so that an announcement may be initiated. Furthermore, subsequent to the issuance of an announcement, if the same is provided with a request for an order, the further detection of an additional response will engage the response recorder means 23 to cause the same to record any further response condition ascertained on the telephone line, assuming that such response condition is classified as instructions. Thus, whenever the automatic telephone polling apparatus illustrated in FIG. 1 is listening to detect a condition on the telephone line, signal information is supplied from the main input conductor 26 to the AGC amplifier means 4.

The output of the automatic gain control amplifier means is supplied through switch means 28 to the input of the comparitor means 6. The switch means 28, under these conditions, would be in the opposite position from that illustrated in FIG. 1, and it will be appreciated by those of ordinary skill in the art that the switch means 28 typically takes the form of a relay actuated switch which operates as a function of commands issued by the microprocessor means 10.

The comparitor means 6 may take the conventional form of a threshold amplifier or the like which acts in the well-known manner to compare the inputs supplied thereto from the automatic gain control amplifier 4 with a fixed threshold and to provide an output therefrom on conductor 29 only when the input thereto exceeds said predetermined threshold level. The output from the comparitor means 6 is connected through the conductors 29 and 30 to an input to the interrupt request logic 8 and the data converter means 32.

The interrupt request logic 8, in essence, takes the form of a flip-flop which acts to define a well-defined timing pulse each time the output from the comparitor means 6 on conductor 7 goes high. Thus, when, for instance, the system is listening to the telephone line for the purpose of ascertaining conditions thereon, any signal ascertained which exceeds the threshold level of the comparitor means 6 will result in the interrupt logic 8 generating a well-defined logic level which, in essence, occurs at a rate corresponding to input signals on the telephone line exceeding the threshold level defined by the comparitor means 6. The output of the interrupt request logic means 8 is connected through conductor 34 to the interrupt (IRQ) input of the microprocessor means 10. The interrupts generated on conductor 34 are employed by the microprocessor means 10 for purposes of detecting conditions of response on the telephone line in a manner wherein time intervals between the zero crosspoints generated by the logic level of the interrupt request logic means 8 are ascertained and the most prevalent interval is determined. The most prevalent interval determined is then compared with succeeding time intervals of the input signal and the results of such comparison are employed in classifying the input signal as periodic or not. The nature of the periodic or nonperiodic signals determined are then further analyzed to ascertain the condition on the line such as dial tone, a ringing signal, a busy signal, and an absence of signal for a selected period following a detection of periodic or nonperiodic input signals may be relied upon to indicate that an announce operation may be initiated.

This is all accomplished under program control through the operation of a comparitor means 6, the interrupt request logic 8 and the microprocessor 10, operating under program control, in precisely the manner set forth in U.S. patent application Ser. No. 101,149, as aforesaid, and will not be reiterated in great detail here. It is, however, sufficient to here appreciate that the microprocessor means 10, operating under program control, employs this listing configuration to ascertain conditions on the telephone line in a periodic manner through each sequence of operation before initiating a further stage in the sequence.

Thus, for example, once a telephone number is to be dialed, the microprocessor causes the system to go off-hook and initially listens through the configuration named to insure that the dial tone has been acquired. Once dial tone has been acquired, an automatic dialing operation is initiated and, thereafter, the microprocessor again determines conditions which are present on the telephone line. Once a ringing condition is ascertained, this is allowed to persist for a predetermined interval prior to a determination being made that too many rings have occurred for the telephone handset at the site being contacted to answer. If this occurs, a hangup routine and redialing for the next number is initiated. Conversely, prior to the expiration of the predetermined interval during which ringing signals may occur, a busy signal may be detected, whereupon an immediate hangup routine followed by a new dialing operation may be initiated.

Alternatively, the telephone handset may be answered and an answer condition on the telephone line may be determined. Under these conditions, further review of the conditions on the telephone line occurs to ascertain whether or not the telephone handset has been answered by an automatic telephone answering device as indicated by a detection of a prerecorded message. If this condition should occur, a hangup routine is again initiated, followed by a new dialing operation. However, should the answer condition detected be determined to be that associated with an individual's response, an announce routine may be initiated. Thereafter, the listening mode may again be established to ascertain whether or not message information is being supplied on the telephone line, in which case such message information may be automatically recorded by the response recorder 23.

The manner in which each of these determinations is made by the timing of the zero crosspoints supplied by way of interrupts to the microprocessor means 10 is set forth in great detail in U.S. patent application Ser. No. 101,149.

The microprocessor means may take the conventional form of a Motorola MC6802 microprocessor chip or, alternatively, similar conventional microprocessor chips from other manufacturers may be employed. The microprocessor means 10 includes an interrupt input connected to conductor 34 as already described, an 8-bit data bus 36 indicated at the inputs annotated $D_0$–$D_7$ and a 16-bit address bus 38 indicated by the inputs annotated $A_0$–$A_{15}$. Additionally, while not illustrated in FIG. 1 for purposes simplifying the instant disclosure, the microprocessor means 10 also includes a control bus employed to regulate other elements of the system as well as several additional supervisory inputs such as reset, a second interrupt and crystal connections for purposes of timing. All instructions executed by the microprocessor means 10 require two or more machine cycles wherein the machine cycle may be defined as a two microsecond interval for purposes of the instant disclosure.

During the first cycle (fetch), the address bus 38 is pointed to a location in memory containing the instruction to be executed. The data bus 36 will, therefore, contain the OP code of that instruction. This data is read into the microprocessor and decoded at the end of the initial cycle of a pair. During subsequent cycles, the microprocessor executes the instruction, placing appropriate logic levels on the control bus.

The 8-bit data bus 36 and the 16-bit address bus 38 are common to the system and are connected through conductors 40–43 to PROM 12 and the RAM 14. As indicated by the arrows associated with the conductors 40–43, the 8-bit data bus 36 is bidirectional and, hence, information is supplied to and obtained from both the PROM 12 and the RAM 14 therethrough. However, the 16-bit address bus as also indicated by the arrows associated with conductors 41 and 43, is basically unidirectional wherein address information generated by the microprocessor is employed to address the PROM 12 and the RAM 14 so that data may be supplied thereto or therefrom to the 8-bit data bus.

The PROM 12 may take any of the conventional forms of this well-known class of device. For example, an EPROM such as an Intel 2732 erasable, programmable, read only memory may be employed. Typically, the storage capacity of the PROM 12 would be 4k by 8 so that the same could contain the entire program comprising the operational system for the automatic telephone polling equipment illustrated. In operation, the 16-bit address issued by the microprocessor would be supplied to the PROM 12 on the address bus 38 during the first machine cycle of an execution instruction so that the data bus will contain the OP code of that instruction. This data is then read in to the processor and decoded at the end of cycle one. During subsequent cycles, the processor executes the instruction, placing appropriate logic levels on the control bus.

The RAM 14 may take any of the well-known forms of conventional semiconductor random access memory devices. For instance, four Intel 2114 chips may be employed having a 4k by 4 memory capacity. The RAM 14 is principally employed for storing telephone numbers to be automatically called by the system. However, as shall be seen in greater detail hereinafter, each telephone number utilizes an extra end of number digit for purposes of defining which message is to be announced therewith. Thus, in terms of seven digits, the RAM 14 is capable of storing 455 telephone numbers to be called. Additionally, backup battery power is provided to the RAM to prevent loss of telephone number lists during a power failure or the like.

The automatic dialer means 16 is connected through the conductor 45 and an 8 bit latch means 46 to the data bus 36 and to an I/O address decoder means 48. The 8 bit latch means 46 when enabled by an appropriate level on conductor 50 provided by the I/O address decoder means 48, acts to latch up 8 bits of data at a time, representing telephone information read from the RAM 14, for application through conductor 45 to the automatic dialer means 16. More particularly, telephone number information stored in BCD in the RAM 14 is read, pursuant to an automatic dialing operation, a digit at a time and applied through the data bus 36 to the microprocessor means 10 where the same is converted to a 2 out of 7 code. The same is thereafter reapplied through the data bus 36 to the 8 bit latch 46 where the same is latched up whenever an enable level is supplied thereto through conductor 50 by the I/O address decoder means 48. Each digit thus latched in the 8 bit latch means 46 is supplied through conductor 45 to the automatic dialer means 46 which acts, in the well-known manner, to cause an appropriate dial signal to be applied to the telephone line through the closed dial enable switch means 52, the main input conductor 26, the closed phone enable switch 25 and the input/output terminal 2.

The automatic dialer means 16 may take any of the conventional forms of this well-known class of device. For instance, if only touch tone dialing is to be employed, the automatic dialer means 16 may take the form of a conventional Motorola 14410 tone encoder which acts in the conventional manner to translate the 2 out of 7 code to DTMF and applies the sum tones, after appropriate amplification and the like, to the telephone coupler. Additionally, should on-hook/off-hook telephone dialing techniques be preferred, the latched 2 out of 7 code may be applied to an automatic dialer 16 in the form of a Motorola 14419 encoder where the data is again coverted to BCD and subsequently to a Motorola 14408 phone pulse coverter which translates this code to dial pulses. Pulse dialing, when employed, would be accomplished by breaking and making the on-off hook relay associated with the telephone coupler. Alternatively, both forms of automatic dialing could be provided in the apparatus illustrated in FIG. 1 upon an alternative, selectable basis.

The I/O address decoder means 48 may take any of the well-known forms of this conventional class of device which responds to address information on the address bus 38 to provide a select output to one of the various I/O devices connected thereto. More particularly, it will be seen that the I/O address decoder means 48 is connected to the address bus 38 through the conductor 54 and to a plurality of input/output devices through conductors 50 and 55-59. Additionally, as indicated by the conductors 60-62 the I/O address decoder means 48 selectively provides select levels in response to a decoding of address levels on the 16 bit address bus 38 for the PROM 12, the RAM 14 and the asynchronous communication interface adaptor 20. Though not illustrated in FIG. 1, several of the control outputs of the microprocessor means 10 are provided to the I/O address decoder means 48 to additionally control the operation thereof.

In addition to providing select levels to the PROM 12, the RAM 14, and the asynchronous communications interface adaptor 20 to cause the same to be operable only in the presence of such select level from the I/O address decoder means 48, the I/O address decoder means selectively enables a plurality of input/output devices. The manner in which the 8 bit latch means 46 is enabled by a level on conductor 50 from the I/O address decoder means 48 to latch up the 8 bits of data then on the data bus 36 has already been described. Additionally, the I/O address decoder means 48 additionally controls the operation of a 24 bit input buffer 64, 12 bit latches 66 and 68 and an 8 bit latch 70. Additionally, while not illustrated in FIG. 1, further input-/output peripherals may be accomodated within the automatic telephone polling apparatus illustrated in FIG. 1 through the decoding techniques available through the I/O address decoder means 48. Thus, a printer, alarms, and/or additional displays may also be employed within the overall general system illustrated in FIG. 1.

The 24 bit input buffer 64 may take the convential form of a 24 bit input 8 bit output device wherein one of three sets of 8 bit inputs are selectively gated to the 8 bit output thereof depending upon the enable conditions supplied to the enable inputs thereof. More particularly, three input conductors 55-57 are supplied as enable inputs to the 24 bit input buffer 64 from the I/O address decoder means 48 and it will be appreciated that a high level on conductor 55 will cause a first group of 8 of the inputs thereto to be gated to the 8 bit output thereof on conductor 72, a high on the conductor 56 will cause a second set of the 8 inputs thereto to be gated to the 8 bit output thereof on conductor 72 while a high on the enable input conductor 57 will cause a third group of 8 of the inputs thereto to be gated to the 8 bit output thereof on conductor 72. The 8 bit output of the 24 bit input buffer 64 is connected as indicated by the annotations $D_0$-$D_7$ through the conductor 72 to the 8 bit data bus 36.

The inputs to the 24 bit input buffer 64, as plainly marked in FIG. 1, establish selected operational modes for the system or alternatively, in the case of the 12 station key pad 74 act to input data, in the form of telephone numbers or the like into the system.

The 12 station key pad 74 may take the form of a conventional touch tone telephone key pad, or the like which acts in response to a depression of a key to input data representative of the decimal digit depressed into the system in suitable format. More particularly, if an ordinary touch tone pad is employed for the 12 station key pad 74, data in the form of a 2 out of 7 code will be entered into the system. Under these conditions, this data should be translated into BCD for processing by the system. Such translation may be directly implemented by a Motorola 14419 BCD encoder or alternatively, such translation may be handled by the microprocessor 10. At any rate, each time a digit at the key pad 74 is depressed and the system is otherwise in the program mode, 8 bits of data are supplied from the 24 bit input buffer 64 through the data bus 36 for storage in the system, ultimately within the RAM 14.

The remaining inputs to the 24 bit input buffer 64 as indicated in FIG. 1 control operational modes within the system which are selectable by the operator in the following manner:

The write input to the 24 bit input buffer 64 will cause the contents of the RAM 14 to be written on a cassette loaded at the response recorder 23 so that the list of telephone numbers presently in RAM may be preserved.

The read input to the 24 bit input buffer 64, conversely, will cause the contents of a cassette loaded in the announce recorder 22 to be read and loaded into the RAM 14, under program control, so that a preserved list of telephone numbers can be reused.

The print input to the 24 bit input buffer 64 will cause embodiments of the automatic telephone polling apparatus depicted in FIG. 1, which employ a printer, to print out the list of telephone numbers stored in the RAM for inspection.

The clear input to the 24 bit input buffer 64 will cause the last telephone number entered into the system at the 12 station key pad 74 to be cleared from the system.

The enter input to the 24 bit input buffer 64 will cause the last telephone number entered at the 12 station key pad 74 to be entered into RAM.

The address reset input to the 24 bit input buffer will cause the address pointer for the RAM memory 14 to be reset to the beginning of the list. This input is typically employed prior to a print operation to insure that the entire list of telephone numbers present in the RAM is printed, rather than the current phone number being pointed to together with succeeding numbers.

The MIC or microphone input to the 24 bit input buffer 64 is employed when the microphone switch for the microphone available on the system is depressed to indicate to the system that further or new messages are to be prepared.

The centrex input to the 24 bit input buffer 64 acts to shift the output functions of the system from normal telephone line operation to those appropriate for centrex operation. Typically, this will cause the system to automatically dial one digit and then search for another dial tone.

The program input to the 24 bit input buffer is employed to place the system in a program mode where new telephone numbers may be entered into RAM.

The run input to the 24 bit input buffer 64 is employed to place the system in the operational made.

The list input to the 24 bit input buffer 64 is employed to cause the system to read and display the next telephone number listed in the RAM.

The inputs illustrated at the left of the 24 bit input buffer 64 are typically provided on the console in the form of buttons or switches for acuation by the operator. The input annotated MIC may correspond to the microphone connection switch 76 for the microphone input to the main input conductor 26. Information input to the microphone upon a depression of switch 76 will be recorded by the response recorder 23.

The 12 bit latch means 66 may take any of the conventional forms of this well-known class of device and acts in the well-known manner to latch the 12 lists present at the inputs thereto whenever the same is enabled. The 12 bit latch 66 is connected to the address bus 38 through the 12 conductors present within the input conductor 78 which are connected as indicated by the annotations $A_0$–$A_{11}$ to the low order 12 bits within the 16 bit address bus 38.

Accordingly, whenever an enable level is supplied by the I/O address decoder means 48 on conductor 58 to the 12 bit latch 66, the 12 low order bits on the address conductor are latched up. The output of the 12 bit latch corresponding to the 12 bits latched from the address bus are applied through the cable 80 to the light switch and relay indicia and controls indicated generally by the block 82. It should be appreciated by those of ordinary skill in the art that the lights indicated by the block 82 are indicia which generally provide information to the operator as to the status and mode of operation which presently obtain within the system. The switches and relays generally refer to switches or input conditions established by an operator causing operations requiring the closing of switches within the system which are operated by relays and the like.

The 12 bit latch means 68 takes the same form as the 12 bit latch means 66. Here, however, an 8 bit input is provided from the data bus through the conductor 84 while the enable input therefor is supplied through conductor 59 from the I/O address decoder 48. The output of the 12 bit latch 68 is supplied through the conductor 86 to the display 18 which functions to display the telephone number with which the system is currently operating. More particularly, in the run mode, the telephone number display 18 will display and advise the operator as to the telephone number presently being called or to which an announcement is presently being made. In a program mode, the telephone number display 18 will display the telephone number input to the system at the 12 station key pad 74 so that if such number corresponds to that intended to be entered, the entered input may be actuated to cause the same to be written into the RAM.

The output of the 12 bit latch 68 is also supplied through conductors 86 and 88, to the display 19 which, as indicated, displays the addressed currently being operated upon from RAM. The number of telephone calls which have been attempted by the system, and the number of telephone calls which have been successfully completed by the system.

The 8 bit latch means 7 may again take any of the conventional forms of this well-known class of device and here acts to latch 8 bits from the address bus whenever an enabling signal is provided thereto from the I/O address decoder means 48 through the conductor 59. It should here be noted that both the 12 bit latch 68 and the 8 bit latch 70 are commonly enabled by the I/O address decoder means 48 on the conductor 59. The 8 input bits to the 8 bit latch 70 are supplied, as indicated, through conductor 90 from the address bus 38 and more particularly, the 8 bit latch 70 acts to receive address bits $A_0$–$A_3$ and $A_8$–$A_{12}$. The output of the 8 bit latch 70 is supplied through conductors 92 and 94 to each of the displays 18 and 19.

The asynchronous communications interface adaptor 20 is selectively enabled through conductor 60 from the I/O address decoder means 48. The asynchronous communications interface adaptor (ACIA) may take the conventional form of a bidirectional parallel-to-serial-to-parallel convertor which functions in the well-known manner to convert parallel data from the data bus to serial for purposes of outputting for recording purposes or to convert serial data received from the announce recorder 22 to parallel data for purposes of placing the same on the data bus 36 for entry into the ram 14 or the like. The asynchronous communications interface adaptor may also take the conventional form of a 6850 chip as available from Motorola and, as indicated in FIG. 1 is connected to the eight-bit data bus through conductor 96 and to the address bus 38 through single bit conductor 98. Furthermore, as indicated in FIG. 1, the single bit conductor 98 connects bit $A_4$ from the address bus to an input of the asynchronous communications interface adaptor 20.

A further input to the asynchronous communications interface adaptor 20 is supplied through conductor 100 from the data convertor means 32 while an additional output therefrom is provided through conductor 102 to a keyed frequency shift tone generator 104. Simply put, the function of the ACIA 20 is to convert parallel data from the data bus 36 to serial format and to output the same to the frequency shift keyed tone generator 104 whenever a write operation is occurring to the response recorder 23 such as occurs when it is desired to read the contents of the ram 14 on to a cassette. Alternatively, this operation also occurs when transfer tones are generated for the purposes of preparing an announcement tape.

The second function of the ACIA 20 is to convert serial data received from the data convertor means 32 and output the same to the data bus when reading from the announce recorder. This will occur when memory is being loaded into the ram 14 from the cassette loaded at the announce recorder 22 or alternatively when transfer tones associated with announcements are being detected. Additional functions performed by the ACIA 20 include, in the conventional manner, start and stop bit generation in accordance with the Kansas City format, sync generation and detection in accordance with the Kansas City format, parity generation and checking, and data formatting under constraints where a tape character consists of a start bit, eight data bits, a parity bit, and a stop bit.

The data convertor means 32 may take the conventional form of a A to D convertor or any other conventional form of data translation device which acts to receive analog information, in this case from the announce recorder 22 and translates the same into digital form so that the same may be further translated from digital serial to digital parallel by the ACIA 20. The data convertor means 32 functions within the embodiment of the automatic telephone polling apparatus illustrated in FIG. 1 to load phone numbers being read from a cassette loaded in the announce recorder 22 into the ram. More particularly, under such conditions, the serial analog data representing telephone numbers to be loaded or the like are read from the cassette loaded in the announce recorder 22 and supplied through the switch means 28 when the same is in the position shown in FIG. 1 to the comparator means 6. The comparator means 6, as aforesaid, is basically a threshold detector which here acts to reconstitute the analog tones read from the cassette to appropriate logic levels which are then fed to the data convertor 32.

The analog signal supplied to the data convertor is translated into digital form so that digital information in a serial format is supplied from the data convertor 32 through the conductor 100 to the ACIA unit 20. Under these conditions, the ACIA unit 20 will act to translate the serial digital information received on conductor 100 into parallel form so that the same may be supplied as eight bits in parallel through the conductor 96 to the common data bus 36 for subsequent loading into the ram 14.

The FSK tone generator means 104 connected to the output of the ACIA unit 20 through the conductor 102 may take any of the conventional forms of this well-known class of device. Here, the frequency shift keyed tone generator means 104 typically acts to generate a first tone for a 1 and a second tone for a 0 so that the same is capable of responding to digital information in serial form supplied by the ACIA unit to cause various forms of data to be written on a cassette loaded at the response recorder 23. For example, a 1 may consist of eight 2-KHz sine waves while a 0 may comprise four 1 KHz sine waves. Thus, in this manner, digital data output from the ACIA unit 20, in response to information being read from the ram such as when the telephone number table therein is to be recorded, or alternatively, inserted from the 12 station key pad 74 such as when messages are being coded with a unique designation number, as shall be more fully described below, may be written in analog form on a cassette loaded at the response recorder 23.

The output of the FSK tone generator 104 is connected through a filter formed by resistors 106 and 107 and capacitor 108 to the microphone input of the response recorder 23. The filter formed by the resistors 106 and 107 and the capacitor 108, as will be readily appreciated by one of ordinary skill in the art, is a tee filter which acts to further shape the sine wave output of the FSK tone generator 104 so that an appropriate sine wave input at the designated frequency is supplied to the microphone input of the response recorder 23.

The response and announce recorders 22 and 23 may take the conventional form of variable length closed loop cassette recorders conventionally employed in automatic telephone polling equipment, answering systems or the like. For instance, two Panasonic RQ-2309 cassette recorders may be employed for the announce and response functions. The announce recorder 22 is employed only in a playback mode while the response recorder 23 is employed only a record mode and it will be appreciated that both recorders are operated on a selective basis by remote relays, not shown, operating under the control of the microprocessor. Both recorders are continuously powered whenever the system power is on by a six-volt supply.

The announce recorder means 22 acts, as aforesaid, to playback prerecorded messages, for instance to an answering party who has been automatically called, and to provide data for the system under conditions where a prerecorded list of telephone number information is to be loaded into the RAM or the designation code for an announcement which has been read to supply data to the system for housekeeping purposes and the like. In an announce mode, the numerical code associated with each message which has been recorded is first read and is supplied from the monitor output of the announce recorder shown through the switch means 28 in the position shown through the comparitor means 6, the data converter 32 and the ACIA unit 20 so that the same is supplied to the common data bus 36 for inspection by the microprocessor unit 10 and retention so that the system is constantly aware of the last message read. Thereafter, as the announcement proceeds, the analog tone information read from the monitor output of the announce recorder is supplied through the switch 28 in the position shown, the conductor 110, resistor 112, the switch means 114 in the opposite position from that shown in FIG. 1 through the main input conductor 26, the phone enable switch 25 to the telephone line through the phone coupler associated with the terminal 2.

For all other modes of operation, the switch means 114 is retained in the position shown wherein the resistor 116 acts as an appropriate termination for the telephone line. Upon the completion of the announcement being read, and the attentant detection of the system of the stop bit associated therewith, the announce recorder will stop so that the next message in the sequence of recorded messages is in position at the playback stage. If this message is next announced, no rewinding of the endless loop cassette will be necessary to reposition the cassette for another announcement.

In cases where a list of telephone numbers in a cassette has been loaded into the announce recorder 22, all data read therefrom from the monitor output is supplied through switch 28 in the position shown, is reconstituted to appropriate logic levels by the comparitor means 6 and thereafter is translated to digital data in serial form by the data converter means 32. Thereafter, it is translated into parallel form by the ACIA unit 20 and applied in parallel through conductor 96 to the common data bus 36 for loading in the RAM. Thus, in this manner, the announce recorder provides the announce capability for the system as well as the ability to load the RAM 14 with previously established and preserved lists of telephone numbers for use within the system.

The response recorder 23 is employed in the record only mode and essentially provides three functions within the system depending on the mode of operation being utilized. When messages are being made by an operator as indicated by a closure of the microphone switch 76, a designation number for the message to be made is first inserted by the operator at the 12 station key pad 74. This digital information is placed from the 24 bit input buffer 64 into the common data bus 36.

Subsequently, the 8 bits of information in parallel is serialized by the ACIA unit 20 and the serial digital data is applied through conductor 102 to the FSK tone generator 104 where it is translated into the analog form described above. Thereafter, analog information in the form of frequency coded sine waves are supplied from the filter formed by the resistors 106 and 107 and the capacitor 108 to the microphone input of the response recorder 23 where the same are recorded. Thereafter, the operator will record the desired message through the microphone 118 and this will continue until such time as sufficient messages, each bearing a unique designation number, have been recorded at the cassette loaded at the response recorder 23. Of course, when these messages are to be employed in the automatic telephone polling apparatus illustrated in FIG. 1, the cassette prepared at the response recorder 23 is physically placed into the announce recorder 22.

A second mode of use for the response recorder 23 occurs when it is desired to preserve the telephone list within the RAM 14. This occurs, as aforesaid, by causing the contents of the RAM to be read a digit at a time onto the common data bus 36 and each digit is subsequently applied therefrom to the ACIA unit 20 where it is serialized. The serial data is then applied through the conductor 102 and transformed into an analog format by the FSK tone generator means 104 so that it is recorded as analog data at the response recorder means 23. Finally, the response recorder 23 may be employed, in embodiments of equipment where it is desired to record responses on the phone line from the contacted location. Thus, under these circumstances, the completion of an announce operation by the announce recorder 22 could cause the microprocessor to actuate the response recorder 23 so that any response by a contacted location which was placed on the phone line and hence applied to the input/output terminal 2 could be directly recorded by the response recorder 23. Alternatively, for such modes of operation, the microprocessor could monitor the line to ascertain the presence of a response and thereafter the response recorder 23 could be actuated.

In operation of the automatic telephone polling equipment illustrated in FIG. 1, an operator would typically prepare a message tape by loading a cassette in the response recorder means 23 and thereafter close the microphone switch 76. A digit typically from 1 to 7 would then be entered by the operator at the 12 station key pad 74 for purposes of defining the message to be subsequently input by the operator. When this digit is entered, the same is applied through the conductor 72 to common data bus 36 and subsequently, under microprocessor control, through the ACIA unit 20 where the digital information is serialized and applied to the FSK tone generator means 104 which translates the same into the analog form previously described. Thus, a five hundred millisecond record is written on the cassette in Kansas City standard format identifying the following message. The operator may then record any desired message through the microphone 118 and this is continued until a series of messages are recorded and the cassette loaded at the response recorder corresponding in number and format to the group of messages which are desired to be selectively output by the system. The manner in which message recordation in the multi-message mode established within the purview of the instant invention is treated under software control is set forth in greater detail in connection with FIG. 2.

As a further predicate to establishing necessary input conditions for the operation of the automatic telephone polling apparatus illustrated in FIG. 1, telephone numbers, each with a unique code defining the message to be announced therewith must also be entered into the system. For this purpose, the system is placed in a program mode and each telephone number together with an appropriate digit defining the number of the message to be announced therewith is entered by the operator at the 12 station key pad 76. As each digit is entered, it is supplied through the conductor 72 to the common data bus 36 wherein the same is applied to the microprocessor means 10 and displayed at the telephone number display 18. Upon completion of each telephone number together with its associated digit defining the message to be announced, the operator will inspect the same at the telephone number display 18 to ensure that the telephone number entered and the digit defining the message to be announced is correct in all respects. If such number is correct together with the digit defining the message to be announced therewith, the operator will depress the enter key at the system console which will cause the information to be written into RAM 14. This, of course, will continue until the entire list of telephone numbers to be contacted for the message sequence program has been entered into RAM. Alternatively, as will now be readily appreciated by those of ordinary skill in the art, a prior list of telephone numbers which had been previously placed in RAM and subsequently recorded on a cassette could be loaded in the announce recorder and automatically written into the RAM through the write mode of operation previously described. In this mode of operation, each digit of a telephone number recorded on a cassette would be read from the announce recorder 22, and reconstituted into appropriate logic level by the comparitor means 6 and converted into digital information by the data convertor 32. Thereafter, it would be transformed from serial to parallel form by the ACIA unit 20 and applied as 8 bits of parallel information to the common data bus 36 for subsequent application and writing the RAM 14. Thus, in this manner too, a list of operational telephone numbers may be loaded into the RAM 14.

Once a cassette has been prepared having a series of messages, each with a unique code defining which message of a sequence it is for a given list of telephone numbers to be called and the list of telephone numbers, each with a unique code defining a message to be associated therewith by the microprocessor means 10 has been loaded in the RAM 14, the automatic telephone polling apparatus illustrated in FIG. 1 is ready for operation. For this purpose, the cassette having the sequence of messages is placed into the announce recorder means 22 and the system is placed in the run mode by the operator by depressing the appropriate key at the operator console. Thereafter, automatic operation of the system will commence.

Upon commencement of operations in the run mode, the microprocessor means 10 issues instructions which cause an off-hook command to be issued to the telephone coupler so that the telephone line is connected to the input/output terminal 2. Additionally, the phone enable switch 25 is placed in a closed condition, the switch means 28 is closed to the output of the automatic gain control amplifier means 4 while the switch means 114 is retained in the position shown in FIG. 1 to provide an appropriate termination for the telephone line. Under these conditions, signal information on the telephone line will be coupled through the input/output terminal means 2, the main input conductor 26, and the AGC amplifier means to the comparator means 6. Each time an input signal on the telephone line exceeds the predetermined threshold level of the comparator means 6, as aforesaid, the interrupt request logic 8 will generate the well-defined timing pulse for application to the interrupt input of the microprocessor means 10 connected to the conductor 34. The microprocessor means 10 then monitors the telephone line in the manner set forth in U.S. application Ser. No. 101,149, as aforesaid, to ascertain whether or not dial tone has been acquired.

Upon an acquisition of dial tone, a telephone number will be selected from RAM for the purposes of issuing an automatic calling sequence. The manner in which this telephone number is selected from RAM 14 is described in greater detail in connection with FIG. 3. Here it is sufficient to appreciate that telephone numbers will be selected from RAM on the initial basis of those which have been previously called the least times which, assuming a start-up operation, will not be highly relevant as no telephone number listed in the RAM will have been tried at all under the conditions here being assumed. The second criteria imposed is that a telephone number is selected from RAM if possible which has an announce message associated therewith which corresponds to the announce message already at the playback position at the announce recorder 22. Should no such number be available, the announce recorder will be advanced by one message, however, under the conditions here being described it may be assumed that a telephone number having a message associated therewith corresponding to the current position of a message at the playback station of the announce recorder is present if it is assumed that at least one telephone number in the RAM is associated with at least such message on the cassette loaded at the announce recorder 22.

Once an appropriate telephone number has been selected, the displays 18, 19 and 82 are updated and the telephone number selected is applied 8 bits at a time through the 8 bit latch 46 to the automatic dialer unit 16. It will be appreciate that the dial enable switch 52 has already been closed. The manner in which automatic dialing under these conditions occurs under program control is also set forth in sufficient detail in U.S. application Ser. No. 101,149, as aforesaid, and will not be reiterated here. Thus, at this juncture of the specification it is sufficient to appreciate that touchtone pairs or conversely dial pulses are applied from the automatic dialing unit 16 through the main input conductor 26 to the phone coupler connected to input/output terminal 2 and this continues until all digits of the desired telephone number have been read and resulted in touchtone pairs or dial pulses being supplied to the telephone line. Upon a completion of the automatic dialer operation by the microprocessor means 10 the dial enable switch 52 is reopened and the microprocessor means 10 again is responsive to interrupts generated by the interrupt request logic means 8 to ascertain the conditions on the telephone line subsequent to the completion of the dialing operation.

For purposes of the instant description, it may be assumed that the first series of interrupts generated in response to conditions on the telephone line by the interrupt request logic 8 will result in a determination by the microprocessor that a ringing signal is present on the telephone line as the same would normally be expected to result from the automatic dialing operation which has just been completed. However, should a prerecorded message imposed by the telephone company in response to the dialing of an improper number, a busy signal or other erratic advisory tone be encountered, the same will be classified as such by the microprocessor means 10 as soon as sufficient interrupts are generated by the interrupt request logic 8 to make this condition defineable in the manner described in U.S. Ser. No. 101,149, as aforesaid. Typically, such signals will be defineable within approximately four seconds and will cause the microprocessor to initiate a hang-up routine whereupon a new telephone number is selected for an automatic dialing sequence from the RAM which has associated therewith the same announcement, if possible, as that previously attempted and the displays 18, 19 and 82 will be updated.

If it is assumed that no busy signal, telephone company announcement or telephone company erratic signal is detected, ringing will be allowed to continue until a telephone is answered at the dialed site or a period of approximately 32 seconds expires. A period of approximately 32 seconds is automatically timed out by a timer initiated by the microprocessor and is relied upon for a determination that ringing should not occur for longer than this period, in the manner described in U.S. Ser. No. 101,149. Upon a timing out of this period, a determination is made that the location dialed will not answer and hence a hang-up routine and the initiation of a new dialing sequence occurs.

However, if it is assumed that the telephone at the dialed site is answered, the interrupts generated by the interrupt request logic 8 will be monitored by the MPU to ascertain whether or not an individual or a taped message such as provided by automatic answering equipment is present. If a tape message is ascertained in the manner set forth in U.S. Ser. No. 101,149, a hang-up routine is again initiated and a new telephone number is selected for a subsequent cycle of operation. If, however, the monitoring of the interrupts generated results in a determination that an individual is present, an announce routine is initiated.

When an announce routine is initiated, the switch means 28 is placed in the position illustrated in FIG. 1 while the switch means 114 is put in a position to connect with the resistor 112 through the operation of relays initiated by the microprocessor means 10 and the announce recorder 22 is energized. Upon energization of the announce recorder, the announcement per se is supplied to the telephone line through the switch means 28, the conductor 110, the resistor 112, the switch 114, the main input conductor 26 and the input/output terminal 2. The number associated with the next announcement is then read and, after appropriate translation by the data convertor means 32 and the ACIA unit 20 is stored by the microprocessor unit 10 so that the system is aware of the next message to be announced. Upon completion of the announcement read from the announce recorder 22, the response recorder 23 may be connected to the line and actuated to record any response which the announcement may have been calculated to elict, or alternately, the telephone line may be further monitored by the MPU means 10 to ascertain if a response appropriate for connection of the response recorder 23 is present. Alternatively, the mode of operation frequently selected is for the MPU 10 to initiate a hang-up sequence upon completion of the announcement as it is generally unnecessary to record any response which may occur. Thereafter, the microprocessor means will update the displays 18 and 19 and 82 and thereafter select a new telephone number from the RAM 14 for dialing. As will be readily appreciated by those of ordinary skill in the art, the telephone number now selected from the RAM at the completion of the prior announcement will be one, which if possible, has associated therewith the next succeeding message on the cassette loaded at the announce recorder so that manipulation by the tape unit will not be required. This is achieved in the manner further described in connection with FIG. 3.

Figure 3:
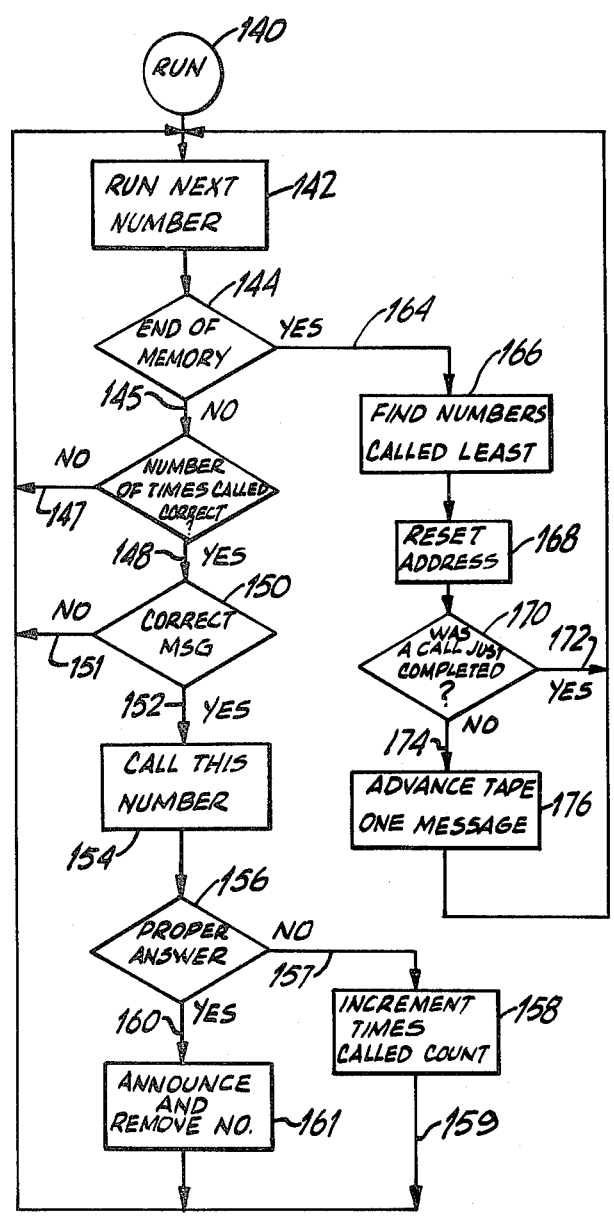
FIG. 3 is a flow chart illustrating the manner in which the exemplary embodiment of the automatic telephone polling apparatus depicted in FIG. 1 may be operated, under program control, according to the multimessage techniques of the present invention.
Figure 2:
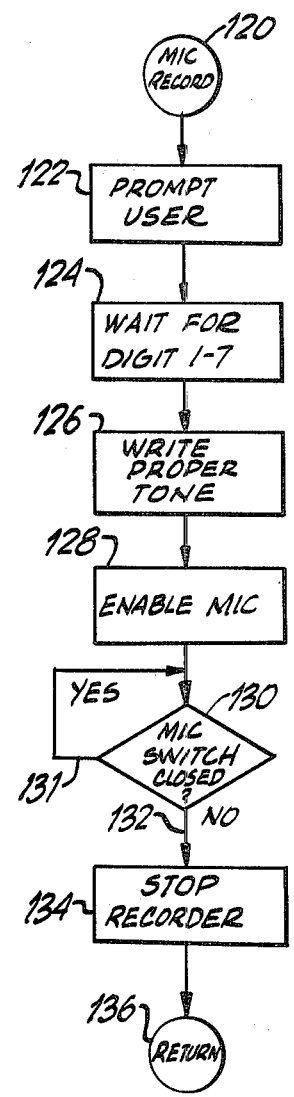
FIG. 2 is a flow chart illustrating the manner in which a plurality of recorded announcements may be made and designated, under program control, in accordance with the teachings of the present invention.

From the manner in which the automatic telephone polling apparatus illustrated in FIG. 1 has been briefly described above, it will be appreciated that the details defining the techniques with which a multi-message media is prepared, under program control, is set forth in conjunction with FIG. 2 while the techniques associated with the selection of an appropriate telephone number associated with the next announcement present at the play-back station, under the control of the microprocessor, are set forth in connection with FIG. 3. Furthermore, the manner in which the overall apparatus illustrated in FIG. 1 is operated under microprocessor control in areas other than that specifically set forth in FIGS. 2 and 3 is generally described in U.S. Ser. No. 101,149 and the detailed programs attached as an appendix to that application are sufficient for the control of the microprocessor means 10 illustrated in FIG. 1 with the exception of the logical modes of operation generally illustrated in FIGS. 2 and 3. Accordingly, reference to U.S. Ser. No. 101,149, whose disclosure is hereby incorporated by reference herein, is thus made for general and specific details of the operation of the automatic telephone polling apparatus illustrated in FIG. 1 for all areas other than those associated with FIGS. 2 and 3 which are directed to transforming the CGS-4k programmable dialer, as available from Digital Products Corporation of Ft. Lauderdale, Fla., into a multiple message device incorporating the features of the instant invention.

The manner in which a plurality of recorded announcements are made and designated, under program control in accordance with the teachings of the instant invention, are set forth in a highly simplified manner in the flow chart illustrated in FIG. 2. Similarly, the manner in which the exemplary embodiment of the automatic telephone polling apparatus depicted in FIG. 1 is operated, under program control, to select telephone numbers in a manner to insure that those telephone numbers having the least history of previous attempts are initially defined, and thereafter telephone numbers are selected, where possible, in a manner to correspond to an announcement already at the playback station so that unnecessary media displacement is avoided is set forth in a highly simplified manner in connection with the flow chart illustrated in FIG. 3. However, while the flow charts illustrated in FIGS. 2 and 3 set forth the program sequence by which the instant invention is implemented by the microprocessor under program control, the same are highly simplified so as to quickly present to the reader in a generalized manner, the techniques through which the operation of the system is implemented. Should, however, the reader seek additional detail with respect to the specific programming details associated with each flow chart, reference should be made to the appendix attached hereto which sets forth an exemplary, annotated program for implementing the steps of programmed operation illustrated in FIGS. 2 and 3.

Referring now to FIG. 2, there is shown a flow chart illustrating exemplary techniques with which a plurality of recorded announcements may be made and designated, under program control, in accordance with the teachings of the present invention. More particularly, when the microphone button 76 as illustrated in FIG. 1, is activated, this input condition (MIC) will be applied to the 8 bit data bus 36 by the 24 bit input buffer 64. When this 8 bit signal is detected by the microprocessor means 10, in its periodic monitoring of the data bus, under program control, a branch operation to the MIC record routine illustrated in FIG. 2 will occur. The MIC record routine illustrated in FIG. 2 is entered at the location indicated by the circular flag 120. Upon entry to this routine, the microprocessor acts to prompt the user or operator in the manner indicated by the rectangle 122 by placing a 0 on the telephone number display 18. Thereafter, the microprocessor awaits receipt of an appropriate coding digit for the message which will be subsequently recorded. Thus, as indicated by the rectangle 124, the microprocessor awaits receipt on the common data bus 36 of a digit from 1 to 7 as entered by the operator at the 12 station key pad 74. The limitation in coding of messages with digits 1 through 7 so that up to 7 distinct messages may be entered and coded at the cassette loaded at the response recorder is here somewhat of an arbitrary limitation selected as a matter of convenience since seven coding tones are readily available. However, should it be desired to employ an embodiment having a greater message capability, a coding scheme employing pairs of tones or the like may be employed.

Furthermore, while the step of waiting for a digit indicated by the rectangle 124, is indicated as a discrete step, it will be appreciated by those of ordinary skill in the art that the program is effectively sitting in a closed loop. Upon receipt of the appropriate coding digit for the message to be recorded, the proper tone, corresponding to the digit depressed, is written on the record media loaded at the response recorder in the manner indicated by the rectangle 126. Thus, effectively the microprocessor means 10 sits in a monitor loop awaiting the receipt of an 8 bit code corresponding to one of the digits 1 through 7 on the data bus and upon receipt of such digit, a digital code corresponding thereto is returned to the data bus by the microprocessor 10 for application to the ACIA unit 20. This 8 bit code is serialized and thereafter applied through conductor 102 to the FSK tone generator 104 whereupon the same in written on the record medium.

After the appropriate coding tone has been written on the record medium in the manner indicated by the rectangle 126, the microphone is enabled in the manner indicated by the rectangle 128. The enabling of the microphone in the manner indicated by the rectangle 128 is implemented, under program control, by the microprocessor means 10 issuing a command causing the relay control switch 76 for the microphone 118 to be closed. As the response recorder was actuated, under program control, when the proper tone was written in the manner indicated by the rectangle 126, the microprocessor tests to ascertain whether or not the microphone switch is in a open condition indicating that the operator has completed dictating an announcement into the microphone. Thus, as indicated by the diamond 130, the microprocessor tests to ascertain whether or not the MIC switch, i.e., the depressible button on the microphone supplied with the unit, is in a closed condition. If the microphone switch is in a closed condition, as indicated by the arrow 131 annotated yes, the microprocessor returns to the beginning of the test sequence associated with the diamond 130 and effectively sits in this loop until the microphone switch is open. Upon a detection that the microphone switch has been opened, as indicated by the arrow 132 annotated no, the microprocessor assumes that the message has been completed. Accordingly, the recorder is stopped in the manner indicated by the rectangle 134 by an opening of the relay therefor and thereafter, as indicated by the circular flag 136, a return to the calling routine occurs.

The same sequence of operations as is illustrated in FIG. 2 may continue until the operator has recorded seven distinctly encoded messages, it being appreciated that each time the mike record button is closed by the operator, branching to the microphone record subroutine illustrated in FIG. 2 will occur so that a sequence of uniquely coded announcements are produced under program control at the response recorder. Subsequently, the operator will cause a list of telephone numbers to be loaded in the RAM in the manner described above, each telephone number loaded having one digit therein which uniquely defines the announcement to be produced when that telephone number is called by the automatic telephone polling apparatus illustrated in FIG. 1. With the constraint as to a limit of seven messages in the exemplary subroutine depicted in FIG. 2, it will be appreciated that each telephone number will be entered together with an additional digit which may vary from 1 to 7, assuming seven distinct announcements have been encoded.

Upon the completion of the preparation of the announcement at the response recorded 23 and the loading of a list of telephone numbers to be called in the RAM 14, the cassette prepared at the response recorder is removed and physically placed in the announce recorder 22. The operator then may place the system in the run mode by a depression of the appropriate key at the operator console.

Referring now to FIG. 3, there is illustrated a flow chart illustrating the manner in which the exemplary embodiment of the automatic telephone polling apparatus depicted in FIG. 1 may be operated, under program control, according to the multimessage techniques of the present invention. More particularly, as illustrated in FIG. 3, it will be seen that when the automatic telephone polling apparatus illustrated in FIG. 1 is placed in a run mode, branching to the Run routine, illustrated in FIG. 3 occurs. The Run routine is entered at the location indicated by the circular flag 140 annotated RUN.

Initially, as indicated by the rectangle 142, the next telephone number is read from the RAM 14. More particularly, as will be appreciated by those of ordinary skill in the art, a pointer is maintained by the microprocessor unit 10 for purposes of pointing to the last address read from the random access memory 14 and this pointer is incremented each time a new address is read. Accordingly, the program step indicated by the rectangle 142 will cause the telephone number present at the location in RAM pointed to by the pointer to be read and loaded into a register at the microprocessor unit means 10. Thereafter, as indicated by the diamond 144, the microprocessor tests under program control to ascertain whether or not the address from the RAM which was read in accordance with the step indicated by the reactangle 142 corresponded to the end of the memory or more particularly was, in fact, a location which followed the last location in which a valid telephone number had been loaded. This may be done, as will be readily appreciated by those of ordinary skill in the art by storing an end of memory character in the RAM at a location following the last location in which a valid telephone number has been loaded or alternatively, a register location may be maintained within the microprocessor wherein the last storage location in which a valid telephone number stored in RAM is defined.

Under these circumstances, if the address employed for reading the next telephone number in the step associated with the rectangle 142 is greater than the last valid address maintained in the counter, it will be apparent that the end of memory is present. However, as it is being assumed that the Run routine has just been initiated, it will further be assumed that the end of memory has not been reached. Therefore, the test associated with the diamond 144 will be negative in the manner indicated by the arrow 145 and hence, the microprocessor will then test whether or not the number of times the telephone number which had been read from the RAM 14 in the step associated with the rectangle 142 is correct in the manner indicated by the diamond 146. More particularly, each telephone number stored in RAM has two bits of the storage location associated therewith which are reserved for the purpose of maintaining a count corresponding to the number of times the automatic telephone polling apparatus illustrated in FIG. 3 has called this number.

This technique, as will be readily appreciated by those of ordinary skill in the art, assumes that after three valid attempts at contacting a number, no further attempts are considered as warranted as it will be appreciated that the automatic telephone polling equipment being described herein completes a cycle of operation within a relatively few hours and hence, after three attempts at contacting a telephone number, it may be assumed that that number is not reachable during this sequence of operations. Furthermore, it should also be appreciated as will be further described hereinafter, that when the Run routine is initially entered, a register is set to 0 within the microprocessor which keeps track of the least number of times any telephone number within the list of telephone numbers in the RAM have been called. Thereafter, each time an end of memory condition, as indicated by the diamond 144 is reached, the microprocessor reads through every telephone number in the list maintained in RAM to ascertain the telephone number therein which has been called the least and this number may be maintained at 0, for reasons which will become apparent below, for several passes through the random access memory 14. At any rate, once the least number of times a number in RAM has been called is ascertained, the register which had been originally set to 0 is incremented to the least number if incrementing is necessary. Thus, the test indicated by the diamond 146 compares the 2 bit positions in the telephone number read in the step indicated by the rectangle 142, which corresponds to the number of times that number had been called, with the least number of times any number in the list has been called as maintained in the register provided therefor.

If in fact, the telephone number read from RAM has been called more times, for instance, once then the number of times indicated in the register is smaller for instance zero, a negative result associated with the test 146 occurs in the manner indicated by the arrow 147. Under these circumstances, branching to the beginning of this routine occurs so that another telephone number may be read in the manner indicated by the rectangle 142 to insure that no telephone number in the list maintained in RAM is tried more frequently than the least times any telephone number listed in RAM has been tried. This means, in the case of early runs of the system, no number will be tried more than once before any number in the list has been tried at least once and the same order will be maintained until each number in the system has been either successfully contacted or tried at least three times.

If it is assumed that the number of times the telephone number read from RAM has been called is correct, in the manner indicated by the arrow 148 annotated yes, the microprocessor next tests in the manner indicated by the diamond 150 as to whether or not the message assigned to the telephone number read from RAM in the step indicated by the rectangle 142 is correct. The microprocessor maintains the count of the current position of the cassette loaded at the announce recorder 22 in the manner aforesaid and hence the test indicated by the diamond 150 is implemented by comparing the message defining digit in the telephone number read from RAM with the message defining digit (1 through 7) of the message currently at the playback station of the announce recorder 22.

For instance, if it is assumed that the first message present on a cassette loaded at the announce recorder 22 has been read, the register in the microprocessor assigned for purposes of keeping track of the current message at the playback station will have a 2 stored therein. Therefore, under the restraints imposed by the test indicated by the diamond 150, a negative result will occur for any telephone number read from RAM in the step associated with the rectangle 142 which requires any other message than the 2 message. Thus, under these conditions, as indicated by the arrow 151 annotated no, a return to the beginning portions of the Run routine will occur and succeeding telephone numbers read from the RAM until a telephone number is ascertained which has associated therewith the message currently at the playback station of the announce recorder 22. In this manner, as will be appreciated by those of ordinary skill in the art, constant repositioning of the message present at the playback station in the announce recorder 22 is avoided and substantial increases in speed of operation are obtained since the microprocessor may run through the steps associated with the rectangle 142 and diamonds 144, 146 and 150 at rates which are much faster than the time which would be required for a repositioning of the prerecorded record media in the announce recorder 22.

Similarly, in this regard, it should be noted that if the 2 message is announced in conjunction with the telephone number which has been fetched, the next time through only a telephone number having associated therewith the third announcement will be read and cycling in this sequential manner will occur in an ascending order governed by the number of messages which have been recorded on the endless loop cassette loaded at the announce recorder 22.

If the proper message is assigned to the telephone number read from RAM, as indicated by the arrow 152 annotated yes, an automatic dialing sequence is initiated in the manner indicated by the rectangle 154. This is done, under program control, in the manner set forth in U.S. Ser. No. 101,149 as aforesaid. Thus, here it is sufficient to appreciate that in response to the program step indicated by the block 154, a branch routine is initiated which causes the microprocessor unit 10, operating under program control, to cause the dial enable switch 52 to be closed and digital data corresponding to each digit of the telephone number to be supplied through the common data bus 36 to the 8 bit latch 46. This information is subsequently supplied to the automatic dialer 16 so that corresponding tone pairs or dial pulses are applied to the phone coupler and hence to the telephone line to acheive the dialing operation.

Upon completion of the dialing operation indicated by the rectangle 154, the telephone line is tested in the manner indicated by the diamond 156 to ascertain whether or not a proper answer is being received. These tests are also performed through a monitoring of the output of the interrupt request logic 8 by the microprocessor unit 10 under program control in the manner described in U.S. Ser. No. 101,149 and hence are not here reiterated, however, it will be appreciated by those of ordinary skill in the art that the tests associated with the diamond 156 in essence act to classify conditions on the telephone line to determine whether a ringing signal, a busy signal, a recorded message, a disconnect signal or a response from an individual is present on the line. Any time any condition other than a ringing signal or an answer from an individual is ascertained, a hang-up subroutine is immediately initiated and a negative condition is indicated for the test associated with the diamond 156.

Furthermore, if ringing persists for more than the approximate 32 second interval established for this purpose by the microprocessor timer, a hang-up routine, as aforesaid, is also initiated and a negative result for the test indicated by the diamond 156 is indicated. Thus, it is only in response to a determination that an individual has answered the phone line that an affirmative result for the test indicated by the diamond 156 is provided.

Any time that a negative result from the test indicated by the diamond 156 occurs, in the manner indicated by the arrow 157 annotated no, the two bit positions stored with the telephone number for the purpose of indicating how many times each number has been called are incremented in the manner indicated by the rectangle 115. Thereafter, as indicated by the arrow 159, a return to the initial portion of this subroutine occurs so that a new telephone number may be read from RAM in the manner indicated by the rectangle 142.

When the tests associated with the diamond 156 are indicative that an individual has answered the telephone handset at the location which has been dialed, as indicated by the arrow 160 annotated yes, an announce operation is initiated in the manner indicated by the rectangle 161 and thereafter, the telephone number for which a successful announcement has been issued is removed from the active list of telephone numbers within the RAM. For the announce operation, the microprocessor unit 10 will issue instructions which cause the switch means 28 to shift to the position illustrated in FIG. 1 and the announce recorder means 22 to be actuated.

The message being played back at the announce recorder is supplied through the switch means 28, the conductor 110, the resistor 112, the switch means 114, the main input conductor 26 and the input/output terminal 2 to the telephone coupler for application to the telephone line.

When the tone associated with the announcement is supplied from the monitor output of the announce recorder 22, through the comparitor 6, the same is applied through data convertor means 32 and the ACIA 20 to the common data bus 36 where the same is applied to the microprocessor unit 10 and stored in a register so that the microprocessor is aware of the next announcement read from the announce recorder and hence, the new play-back position of the announce recorder 22 after the instant message being announced has been completed.

Additionally, as also indicated within the rectangle 161, the telephone number for which the announcement has been issued is removed from its active status within the list of telephone numbers stored within the RAM 14. This may be done in several ways depending upon the desires of the user. For instance, the two bits maintained in storage in association with that telephone number, whose purpose it is to indicate the number of times a telephone number has been called may be incremented to a 1,1 condition which is the maximum number of times a telephone number is to be called. Hence, when this is done the number will be ignored by the system due to the test associated with the diamond 146. Alternatively, an erase or call completed flag may be set in association with that number so that the same is either actually erased from memory or ignored in succeeding steps associated with the rectangle 142.

Upon completetion of the announcement, the subroutine illustrated in FIG. 3 may immediately return to the beginning of the loop so that further telephone numbers may be read in accordance with the step indicated in the rectangle 142 or the announce step indicated by the rectangle 161 may include appropriate provisions for actuating either directly or selectively the response recorder 23 so that an elicted response from the called party may be recorded. Thereafter, a return to the beginning portion of the subroutine illustrated in FIG. 3 will occur so that the next telephone number can be read and processed in the manner indicated by the portion of the subroutine which has just been described.

Thus, in the foregoing manner, the automatic telephone polling apparatus illustrated in FIG. 1 will proceed, under program control, to read down the list of telephone numbers stored in the RAM 14 until the end of the memory is reached. As each number is read from the memory, it is first tested in the manner indicated by the diamond 146 to ascertain whether or not this number has been called more times than the criteria established for the sequence of operations being run. If the number has not been called more than the selected number of times, the telephone number will be tested to ascertain whether or not the message associated therewith corresponds to the message currently at the playback station of the announce recorder 22 in the manner indicated by the diamond 150 and it will be appreciated that each time an announcement occurs, the message at the playback station is advanced by and so that, in effect, the test associated with the diamond 150 may cause several runs through the list of telephone numbers in RAM before a single attempt at calling all telephone number listed therein will occur. However, so long as telephone numbers remain in the list for a given cycle of operation, i.e., the end of memory has not been reached, no repositioning of the cassette within the announce recorder will occur for purposes of placing a call to a telephone number which has been read from memory.

If the telephone number read from memory in step 142 does not correspond to the message presently at the playback station the result of the test associated with the diamond 150 will be negative and a new number will be read from the list and this will continue until such time as a telephone number having an announcement assigned thereto which corresponds to the announcement currently at the playback station is ascertained or the end of memory is reached. Thus, until the end of memory is reached, all media displacement within the announce recorder 22 for repositioning a new message at the playback station occurs only as a result of preceeding announcements.

When the end of memory is detected in the manner indicated by the arrow 164, annotated yes, as associated with the diamond 144, the program acts in the manner indicated by the rectangle 166 to find the numbers which have been called the least. This is done as previously described by the microprocessor going through each telephone number stored in the RAM 14 and inspecting the pair of bits stored therewith which are indicative of the number of times each telephone number has been called. Typically, the number corresponding to the least times any number in the RAM 14 has been called will not change until several passes through the RAM have occurred since many numbers are skipped during each pass through the RAM due to the tests conducted under program control for the correct message as explained in association with the diamond 150. Thus, in any initial run, no number in the list will have been called at all and a 0,0 condition will reside in the bit pair associated with each telephone number. As each pass through the memory occurs, calls for which a successful dialing and announce operation have occurred will have a 1,1 placed in the bit pair while telephone numbers which are called unsuccessfully will have a 1 placed in the first bit position thereof. However, numbers skipped due to the test associated with the diamond 150 will retain their 0,0 condition and hence, it will be apparent that several passes through the memory will be required before the step associated with rectangle 166 will cause a change in the register retaining an indication of the least times any number in the list of numbers stored in RAM 14 have been called as employed in association with the test associated with the diamond 146.

Once a determination has been made as to the least number of times any telephone number in RAM 14 has been called and this number has been stored in a register for use in association with the test associated with the diamond 146, the address pointer is reset to the beginning of the list of telephone numbers stored in RAM 14 in the manner indicated by the rectangle 168. Thereafter, as indicated by the diamond 170, a test is conducted to ascertain whether or not a telephone call has just been successfully completed. The test is achieved by comparing the state of the register which maintains the current position of the media at the playback station with the contents of the register which would have received position information from the message just announced. If the same correspond, it will be apparent that a message has just been read at the playback station and hence, an announcement has just taken place. The purpose of this test is to insure that unnecessary media displacement is avoided and at the same time to prevent a condition where all of the remaining telephone numbers in a list which qualify as telephone numbers which have been called least do not correspond to the message currently at the playback station. More particularly, if an announcement has just been made, the message located at the playback station has been changed due to the announcement per se and hence, advancement of the message at the playback station is not required. Under these conditions, as indicated by the arrow 172 annotated yes, a return to the beginning of the Run subroutine is initiated where further sequencing through the left-hand portion of the subroutine will continue, resulting in further announcements and the like for telephone numbers qualifying as called the least until the end of memory is again reached.

If, however, an announcement has not just been completed, the result of the test associated with the diamond 170 will be negative. Under these conditions, as indicated by the arrow 174 annotated no, the tape must be advanced to change the message to avoid a result where all qualifying telephone numbers in RAM fail to correspond to the telephone number at the playback station. Therefore, as indicated by the rectangle annotated 176, the announce recorder 22 is actuated to advance the cassette by one message location so that a new message is now at the playback station which may now correspond to message associated with qualifying telephone numbers in the list within the RAM 14.

Thus, it will be appreciated that the run subroutine illustrated in FIG. 3 insures that the cassette loaded in the announce recorder 22 is only advanced under circumstances where the possibility exists that no qualifying telephone number present in the RAM 14 may have the announcement presently at the playback station associated therewith. Under these constraints, clearly, all unnecessary displacements of a record media located at the announce recorder are avoided to insure that tape wear is held to an absolute minimum and that no system delay will occur due to various repositioning operations of the cassette in the announce recorder which would otherwise by necessary. However, the queuing of the telephone numbers listed in the RAM 14 on the basis of those called least insures that system operations will proceed in a stepwise graduated manner.

These modes of operation are highly advantageous since, as will be readily appreciated to those of ordinary skill in the art, processing operations by the microprocessor means 10 are quickly accomplished while operations attending the repositioning of the tape and the actual issuance of telephone calls on the telephone line are relatively lengthy in comparison and a non-judicious entry into such operations would result in wasteful, time consuming operations as well as excessive wear of the media loaded at the announce recorder 22.

Although this invention has been described in connection with the exemplary apparatus illustrated in FIG. 1, it will be apparent to those of ordinary skill in the art that various modifications in the depicted apparatus may be made to satisfy design criteria or to suit convenience without altering the teachings of the instant invention. Furthermore, while the invention has been disclosed within an environment principally directed to operations associated with automatic telephone polling equipment or the like, it will be appreciated that the concepts of the invention set forth herein are equally applicable to other environments wherein a multimessage capability is desired in relation to a list which is readable from memory each item of such list being particularly associated with one of said messages.

Furthermore, while the messages being described herein have typically taken the form of prerecorded announcements, it will be seen that the same concepts as taught herein may be readily extended to situations where blocks of data are selectively read from a media.

While the invention has been described in connection with a specific embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

APPENDIX

This routine is entered every time the dialer finishes with the last number in memory. It checks for the least number of times that any phone number in memory has been called and stores this in location CALL. It then advances the tape one message and stores the next message number in BOT.

| 1. | START | JSR | RESETA | Reset Address to 1. |
|---|---|---|---|---|
| 2. | | LDA A | 2CALL | Assume all have been called twice. |
| 3. | | STA A | CALL | |
| 4. | | LDX | HPHON | Start at beginning of memory |
| 5. | LP | DEX | | |
| 6. | | LDA A | X | |
| 7. | | CMP A | −1 | If A = −1 end of phone numbers. |
| 8. | | BEQ | DONE | |
| 9. | | CMP A | CALL | |
| 10. | | BMI | LP | If A less than CALL continue. |
| 11. | | CMP A | PER | |
| 12. | | BPL | LP | Ignore parity error numbers. |
| 13. | | STA A | CALL | This number called fewer times. |
| 14. | | BRA | LP | |
| 15. | DONE | CPX | HPHON-1 | |
| 16. | | BNE | YES | |
| 17. | | JMP | PROMPT | No number so return to normal. |
| 18. | YES | TST | ERASE | Here because of completed call. |
| 19. | | BNE | NO | |
| 20. | | JMP | ANNOUN | No. Read next message. |
| 21. | NO | CLR | ERASE | Reset erase flag. |
| 22. | | JMP | RUN | |

This routine is entered when the mode switch is in RUN. It searches forwards from the current position in memory for a phone number which has been called the correct number of times and which is to receive the next message. If it finds one it then exits to DIAL. If not, it exits to START.

| 23. NOCALL | JSR | INCA | Do not call this number. Go to next. |
|---|---|---|---|
| 24. RUN | JSR | READP | Read a phone number. |
| 25. | BEQ | START | If Z = 1 then no more numbers. |
| 26. | CMP A | CALL | Check how many times this number has been called. |
| 27. | BNE | NOCALL | |
| 28. | LDX | XASAV | Check for correct message. |
| 29. | DEX | | |
| 30. | LDA A | X | |
| 31. | CMP A | BOT | |

| 32. | | BNE | NOCALL | If not correct do not call. |
|---|---|---|---|---|
| 33. | | JMP | DIAL | |

This routine is entered whenever the MIC switch is closed. It prompts the user and waits for a digit from 1 to 7 to be entered. It then outputs the appropriate tone to the response recorder. It then enables the microphone to permit recording of the message.

| 34. | MIC | JSR | CLRCM | Clear both counters. |
|---|---|---|---|---|
| 35. | | LDA A | "0" | |
| 36. | | STA A | CU | Store prompt. |
| 37. | | JSR | SETDIS | Turn on the displays. |
| 38. | | LDX | IRQMIC | |
| 39. | | STX | IRQV | Set interrupt handler. |
| 40. | | CMP A | IN1 | Reset IRQ F/F. |
| 41. | | CLI | | Enable interrupts. |
| 42. | LP1 | LDA A | CU | |
| 43. | | AND A | 7 | |
| 44. | | BEQ | LP1 | Wait for digit 1 to 7. |
| 45. | | LDX | TAB-1 | |
| 46. | LP2 | INX | | Set X to point to data for this tone. |
| 47. | | DEC A | | |
| 48. | | BNE | LP2 | |
| 49. | | LDA A | X | Get correct data. |
| 50. | | JSR | ONRESP | Turn on the recorder. |
| 51. | | JSR | WRTON | Write this tone. |
| 52. | | LSR | MICLIT | Turn on MIC light. |
| 53. | LPMIC | LDA A | MICSW | |
| 54. | | BEQ | LPMIC | Wait for MIC switch to open. |
| 55. | | BSR | DLY375 | Pause 375 ms. |
| 56. | | LSR | ALLOFF | Shut off recorder and light. |
| 57. | | RTS | | |

This is the interrupt handler used by the MIC routine. It inputs one BCD character, converts it to ASCII, and stores it in the display buffer.

| 58. | IRQMIC | LDA A | IN1 | Input character. |
|---|---|---|---|---|
| 59. | | AND A | 3F | |
| 60. | | ORA A | 30 | Convert to ASCII. |
| 61. | | STA A | CU | Store in buffer. |
| 62. | | RTI | | Return. |

What is claimed is:

1. Automatic announcement apparatus comprising:
   means for recording on a record media a plurality of messages, each of said plurality of messages being recorded in sequence and including a designation code uniquely defining that message, said means for recording including magnetic recorder means, microphone means selectively connectable to said magnetic recorder means for recording a message on said record media, means for selectively supplying one of a plurality of unique designation codes to said magnetic recorder means for recording on said record media and means responsive to an actuation of said microphone means for indicating that said means for selectively supplying one of a plurality of unique designation codes to said magnetic recorder means must be actuated;
   means for selectively reproducing from said record media one message at a time including said unique designation code, said reproducing means having a playback station at which a next message to be reproduced is positioned;
   memory means for storing a plurality of data words, each data word defining a particular operation and including bit information representing a designation code corresponding to one of said plurality of messages; and
   processor means for reading each of said plurality of data words in a sequence from said memory means, said processor means comparing said bit information representing a designation code corresponding to one of said plurality of messages in each data word read with said unique designation code of said next message to be reproduced as positioned at said playback station and attempting to execute said particular operation defined by said data word and to reproduce said next message to be reproduced by said reproducing means only if an affirmative comparison of said bit information and said designation code of said next message is present, said processor means reading a following data word from said memory means without attempting to execute said particular operation defined for a data word for which a negative comparison resulted.

2. The apparatus according to claim 1 wherein said means for selectively supplying one of a plurality of unique designation codes includes multistation key pad means and tone generator means.

3. The apparatus according to claim 2 wherein said record media takes the form of a variable length, endless loop cassette.

4. The apparatus according to claim 2 wherein each designation code uniquely defining a message is written written as a 500 ms record in Kansas City Standard Format.

5. Automatic announcement apparatus comprising:
   means for recording on a record media a plurality of messages, each of said plurality of messages being recorded in sequence and including a designation code uniquely defining that message;
   means for selectively reproducing from said record media one message at a time including said unique designation code, said reproducing means having a playback station at which a next message to be reproduced is positioned;
   memory means for storing a plurality of data words, each data word defining a particular operation and including bit information representing a designation code corresponding to one of said plurality of messages; and
   processor means for reading each of said plurality of data words in a sequence from said memory means, said processor means comparing said bit information representing a designation code corresponding to one of said plurality of messages in each data word read with said unique designation code of said next message to be reproduced as positioned at said playback station and attempting to execute said particular operation defined by said data word and to reproduce said next message to be reproduced by said reproducing means only if an affirmative comparison of said bit information and said designation code of said next message is present, said processor means reading a following data word from said memory means without attempting to execute said particular operation defined for a data word for which a negative comparison resulted, each of said plurality of data words stored in said memory means including bit information representing a value corresponding to the number of attempts by the processor means to execute the particular operation defined thereby, and said processor means acting to increment said value each time an attempt at execution is unsuccessful.

6. The apparatus according to claim 5 wherein said processor means reads each of said plurality of data words from said memory means in sequence and upon reading a data word at an end of said sequence begins again to read data words from said memory means in sequence.

7. The apparatus according to claim 6 wherein said processor means acts upon reading a data word at an end of said sequence to review bit information in each of said plurality of data words representing said value corresponding to said number of attempts at execution of the particular operation defined thereby, said processor means determining a quantity corresponding to the smallest value represented by said bit information in any of said plurality of data words.

8. The apparatus according to claim 7 wherein said processor means additionally compares said quantity corresponding to said smallest value represented by said bit information in any of said plurality of data words with bit information in each data word read from said memory means representing said value corresponding to the number of attempts by said processor means to execute the particular operation defined thereby, said processor means reading a following data word from said memory means without attempting to execute said particular operation defined for a data word for which the values compared were unequal.

9. The apparatus according to claim 6 wherein said processor means acts after reading said data word at an end of said sequence of said plurality of data words stored in said memory means to ascertain if a message has just been reproduced prior to beginning again to read data words from said memory means, said processor means displacing said record media at said playback station through one of said plurality of messages if no message has just been reproduced at said end of said sequence of said plurality of data words.

10. Automatic announcement apparatus comprising:
means for recording on a record media a plurality of messages, each of said plurality of messages being recorded in sequence and including a designation code uniquely defining that message;
means for selectively reproducing from said record media one message at a time including said unique designation code, said reproducing means having a playback station at which a next message to be reproduced is positioned;
memory means for storing a plurality of data words, each data word defining a particular operation and including bit information representing a designation code corresponding to one of said plurality of messages, said particular operation defined by each data word corresponding to initiating an automatic dialing operation to a predetermined telephone number defined by said data word; and
processor means for reading each of said plurality of data words in a sequence from said memory means, said processor means comparing said bit information representing a designation code corresponding to one of said plurality of messages in each data word read with said unique designation code of said next message to be reproduced as positioned at said playback station and attempting to execute said particular operation defined by said data word and to reproduce said next message to be reproduced by said reproducing means only if an affirmative comparison of said bit information and said designation code of said next message is present, said processor means reading a following data word from said memory means without attempting to execute said particular operation defined for a data word for which a negative comparison resulted.

11. The apparatus according to claim 10 additionally comprising automatic dialing means and means for selectively connecting said automatic dialing means, said processor means and said reproducing means to a telephone line.

12. The apparatus according to claim 1 wherein said processor means attempts to execute said particular operation defined by said data word by enabling said automatic dialing means to automatically dial a predetermined telephone number defined by said data word and thereafter determining if the telephone number automatically dialed has been successfully contacted, said processor means enabling said reproducer means to playback said next message at said playback station whenever said telephone number automatically dialed is successfully contacted.

13. The apparatus according to claim 12 wherein each of said plurality of data words stored in said memory means includes bit information representing a value corresponding to the number of attempts by the processor means to execute the particular operation defined thereby, and said processor means acts to increment said value each time an attempt at execution is unsuccessful.

14. The apparatus according to claim 13 wherein said means for recording includes magnetic recorder means, microphone means selectively connectable to said magnetic recorder means for recording a message on said record media, means for selectively supplying one of a plurality of unique designation codes to said magnetic recorder means for recording on said record media and means responsive to an actuation of said microphone means for indicating that said means for selectively supplying one of a plurality of unique designation codes to said magnetic recorder means must be actuated.

15. The apparatus according to claim 14 wherein said processor means reads each of said plurality of data words from said memory means in sequence and upon reading a data word at an end of said sequence begins again to read data words from said memory means in sequence.

16. The apparatus according to claim 15 wherein said means for selectively supplying one of a plurality of unique designation codes includes multistation key pad means and tone generator means.

17. The apparatus according to claim 16 wherein said processor means acts upon reading a data word at an end of said sequence to review bit information in each of said plurality of data words representing said value corresponding to said number of attempts at execution of the particular operation defined thereby, said processor means determining a quantity corresponding to the smallest value represented by said bit information in any of said plurality of data words.

18. The apparatus according to claim 17 wherein said processor means additionally compares said quantity corresponding to said smallest value represented by said bit information in any of said plurality of data words with bit information in each data word read from said memory means representing said value corresponding to the number of attempts by said processor means to execute the particular operation defined thereby, said processor means reading a following data word from said memory means without attempting to execute said particular operation defined for a data word for which the values compared were unequal.

19. The apparatus according to claim 15 wherein said processor means acts after reading said data word at an end of said sequence of said plurality of data words stored in said memory means to ascertain if a message has just been reproduced prior to beginning again to read data words from said memory means, said processor means displacing said record media at said playback station through one of said plurality of messages if no message has just been reproduced at said end of said sequence of said plurality of data words.

20. Multimessage telephone polling apparatus comprising:
    means for selectively reproducing a record media having a plurality of messages recorded thereon, each of said plurality of messages being recorded in sequence and including a designation code uniquely defining that message, said reproducing means having a playback station at which a next message to be reproduced in said sequence is positioned;
    memory means for storing a plurality of data words, each data word defining a particular telephone number to be contacted and including information corresponding to a designation code for one of said plurality of messages;
    means for reading each of said plurality of data words in sequence from said memory means and comparing said information corresponding to a designation code therein with said designation code of said next message present at said playback station;
    means responsive to a valid comparison between said information corresponding to a designation code in a data word read, and said designation code of said next message present at said playback station for automatically issuing dialing signals corresponding to the particular telephone number for which said valid comparison was obtained; and
    means for applying dialing signals issued to a telephone line.

21. The multimessage telephone polling apparatus according to claim 20 additionally comprising:
    means for monitoring said telephone line to detect if an automatically dialed location has been successfully contacted;
    means responsive to a successful contacting of an automatically dialed location for enabling said reproducing means to cause said next message present at said playback station to be reproduced; and
    means for applying said next message to said telephone line.

22. The multimessage telephone polling apparatus according to claim 21 additionally comprising means responsive to an unsuccessful contacting of an automatically dialed location to modify bit information in said data word defining said telephone number automatically called to indicate said unsuccessful contacting.

23. The multimessage telephone polling apparatus according to claim 22 wherein said means for reading each of said plurality of data words in sequence from said memory means is responsive to a reading of a data word at an end of said sequence to begin again to read data words from said memory means in sequence.

24. The multimessage telephone polling apparatus according to claim 23 additionally comprising means responsive to a reading of a data word at an end of said sequence to review bit information in each of said plurality of data words indicative of the number of unsuccessful attempts at contacting for determining a value corresponding to the smallest number of unsuccessful attempts at contacting for any data word stored in said memory means.

25. The multimessage telephone polling apparatus according to claim 24 additionally comprising means for comparing said value to said bit information in each data word read from said memory means representing unsuccessful attempts at contacting and means responsive to a noncomparison condition for causing said means for reading to read the next data word in said sequence.

26. The multimessage telephone polling apparatus according to claim 23 additionally comprising means responsive to a reading of said data word at an end of said sequence of said plurality of data words stored in said memory means for ascertaining if a message has just been reproduced prior to beginning again to read data words from said memory means, said last named means displacing said record media at said playback station through one of said plurality of messages if no message has just been reproduced at said end of said sequence of said plurality of data words.

27. The multimessage telephone polling apparatus according to claim 20 additionally comprising means for recording on a record media a plurality of messages, each of said plurality of messages being recorded and including a designation code uniquely defining that message.

28. The multimessage telephone polling apparatus according to claim 27 wherein said record media takes the form of a variable length, endless loop cassette.

29. The multimessage telephone polling apparatus according to claim 27 werein said means for recording includes magnetic recorder means, microphone means selectively connectable to said magnetic recorder means for recording a message on said record media, means for selectively supplying one of a plurality of unique designation codes to said magnetic recorder means for recording on said record media and means responsive to an actuation of said microphone means for indicating that said means for selectively supplying one of a plurality of unique designation codes to said magnetic recorder means must be actuated.

30. The multimessage telephone polling apparatus according to claim 29 wherein said means for selectively supplying one of a plurality of unique designation codes includes multistation key pad means and tone generator means.

31. A method for conducting multimessage telephone polling comprising the steps of:
    preparing a record media having a plurality of messages by recoding each of said plurality of messages, each message including a designation code uniquely defining that message;
    loading said record media in a selectively actuatable playback device and noting the next message to be reproduced as present at the playback station thereof;
    storing a plurality of data words in a memory in a manner such that each data word represents a telephone number to be automatically called and includes bit information designating a code corresponding to one of said plurality of messages;

reading each of said plurality of data words in a sequence from said memory means;

comparing said bit information designating a code for each data word read to the designation code for the next message to be reproduced as present at said playback station; and issuing dialing signals corresponding to a telephone number to a telephone line for a data word read, only when a valid comparison is obtained.

32. The method of claim 31 additionally comprising the steps of:

monitoring said telephone line to detect if a dialed location has been successfully contacted; and actuating said playback device to cause said next message present at said playback station to be reproduced.

33. The method of claim 32 additionally comprising the step of modifying bit information in a data word defining a telehone number for which dialing signals were issued whenever a successful contacting of a dialed telephone number does not result.

* * * * *

UNITED STATES PATENT AND TRADEMARK OFFICE
CERTIFICATE OF CORRECTION

PATENT NO. : 4,438,296
DATED : March 20, 1984
INVENTOR(S) : FRED J. SMITH

It is certified that error appears in the above-identified patent and that said Letters Patent are hereby corrected as shown below:

In the Abstract, line 11, "operation" should read --operational--.

Column 1, line 32, "cells" should read --calls--.

Column 4, line 6, "automtic" should read --automatic--.

Column 11, line 12, "made" should read --mode--.

Column 14, line 68, "into" should read --onto--.

Column 17, line 36, "such" should read --each--.

Column 32, line 15, "1" should read --11--.

Signed and Sealed this

Seventeenth Day of July 1984

[SEAL]

Attest:

GERALD J. MOSSINGHOFF

Attesting Officer

Commissioner of Patents and Trademarks